(12) United States Patent
Nandakumar et al.

(10) Patent No.: US 9,058,619 B2
(45) Date of Patent: Jun. 16, 2015

(54) SYSTEM AND METHOD FOR MEASUREMENT, PLANNING, MONITORING, AND EXECUTION OF OUT-OF-HOME MEDIA

(76) Inventors: Purushottaman Nandakumar, Bangalore (IN); Vinay Chandra, Atlanta, GA (US)

(\*) Notice: Subject to any disclaimer, the term of this patent is extended or adjusted under 35 U.S.C. 154(b) by 210 days.

(21) Appl. No.: 13/474,277

(22) Filed: May 17, 2012

(65) Prior Publication Data

US 2013/0129149 A1    May 23, 2013

(30) Foreign Application Priority Data

May 19, 2011   (IN) .......................... 1704/CHE/2011

(51) Int. Cl.
*G06Q 30/02* (2012.01)
*G06K 9/00* (2006.01)

(52) U.S. Cl.
CPC ........ *G06Q 30/0276* (2013.01); *G06K 9/00624* (2013.01); *G06Q 30/0266* (2013.01)

(58) Field of Classification Search
CPC .......... G06K 9/00624; G06K 9/00684; G06K 9/00691; G06K 9/00704; G06K 2209/30; G06Q 30/0241; G06Q 30/0251; G06Q 30/0261; G06Q 30/0266; G06Q 30/0272; G06Q 30/0276

USPC .......... 382/100, 103, 104, 107; 348/143, 144, 348/148, 149, 150, 159; 705/14.4, 14.41, 705/14.45, 14.49, 14.5, 14.57, 14.58, 14.62, 705/14.63, 14.68

See application file for complete search history.

(56) References Cited

U.S. PATENT DOCUMENTS

| 8,401,902 | B1 * | 3/2013 | Stone et al. ................. 705/14.72 |
| 2002/0097193 | A1 * | 7/2002 | Powers ............................ 705/1 |
| 2005/0015269 | A1 * | 1/2005 | Polizzotto ........................ 705/1 |

FOREIGN PATENT DOCUMENTS

| KR | 1020090011364 A | 2/2009 | ............ G06Q 10/00 |
| KR | 1020090117185 A | 11/2009 | ............ G06Q 30/00 |
| WO | WO-2006/115911 A2 * | 11/2006 | ............ G06Q 30/00 |

\* cited by examiner

*Primary Examiner* — Andrew W Johns
(74) *Attorney, Agent, or Firm* — Robert Plotkin, P.C.

(57) ABSTRACT

The present invention generally relates to a system for measurement, planning, monitoring and execution of advertisements on out-of-home media. The invention provides a method by which greater eyeball content is ensured to out-of-home media assets thereby benefiting advertisers and ensuring efficient advertising budget spend.

78 Claims, 12 Drawing Sheets

SYSTEM AND METHOD FOR MEASUREMENT, PLANNING, MONITORING, AND EXECUTION OF OUT-OF-HOME MEDIA

CROSS-REFERENCE TO RELATED APPLICATIONS

This application claims priority from Indian Patent Application Serial Number 1704/CHE/2011, filed on May 19, 2011.

FIELD OF THE INVENTION

The present invention generally relates to a system for measurement, planning, monitoring and execution of advertisements on out-of-home media. The invention provides a method by which greater eyeball content is ensured to out-of-home media assets thereby benefiting advertisers and ensuring efficient advertising budget spend.

BACKGROUND OF THE INVENTION in the traditional advertising structure, advertisers employ agencies to plan advertising strategy, create content and secure media space according to desired demographics as well as other parameters such as visibility of the media, advertisement content, space of the media etc. Many media companies employ media representatives to extend their geographic sales coverage and client base. In this model, the transactions are finalized prior to delivery and display/airing of the actual advertisements. This model of advertising media transactions has several inefficiencies. For example, the buyers and sellers of advertisements are geographically fragmented, the marketplace is extremely fragmented, the implementation of the transaction is time and labor intensive, the adoption and application of new technologies is slow, there is an inability to track and correlate ad results, there is a large spread between different types of media and prices in different markets, there is an inability to obtain the effectiveness of specific media to specific products at specific times, and there is a lack of flexibility in changing or adopting media buying to market trends and feedback.

Purchasing the right media for an advertising campaign presents a considerable challenge. Most advertisement space media purchasers require substantial future planning and advanced implementation. In addition, determining and designing the right advertising campaign takes years of experience, industry specific expertise, long-term planning and effort, all of which have permitted advertisement agencies to charge 15% or more for media placement services. However, the advent of digital production, delivery and distribution has created new opportunities for a significantly more flexible and liquid advertising marketplace.

The global economy is becoming more and more integrated. As a result, access in real time to the latest relevant information has become critical to doing business. Such information can make the difference between successful companies and unsuccessful companies that lag behind with respect to their ability to react to changes in the marketplace. Presently, the majority of competitive information is delivered by specialty research and financial firms via proprietary subscription to many fragmented networks, such as Bloomberg™ and Reuters™. This information is used primarily by industries, such as the financial markets, which rely on this information. In addition, it is provided without any filtering, and it is up to the user to find relevant data in the vast quantity of publications, such as daily news releases and press announcements.

Out of home advertising has been a growth industry for the past 60 years, and has recently witnessed a surge as businesses spend more in order to attract consumers for their products. Deeper penetration of media, the Internet and the cheap spread of mobile telephony have created more demand for products. Globalization has also blurred borderlines and businesses are now trying to reach consumers across the world. Out of home advertising (or outdoor advertising) is made up of more than 100 formats and essentially any form of advertising focused on consumers who are "on the go" or out of their homes. Television, Internet and print advertising are other forms of advertising which are more "in home" forms of advertising. Outdoor advertising formats fall into five major categories: billboards (hoardings), street furniture, transit, alternative and cinema.

Billboards are large advertising structures typically found in high traffic areas such as in densely populated urban areas and alongside busy roads. They present large advertisements to passing pedestrians and motorists and afford the greatest visibility due not only to their size but because they allow creative advertisements through extensions and embellishments. Billboard advertisements are designed to catch a person's attention and create a memorable impression very quickly, leaving the reader thinking about the advertisement after they have driven past it. They have to be readable in a very short time because they are usually read while being passed at high speeds. They are used for advertising by hundreds of thousands of small businesses as well as multinational brands. They are the predominant form of outdoor advertising worldwide. Traditional billboards employ either painted form of matter or printed panels of flex which are pasted up. Digital billboards more recently have been employed where advertising is created by software with the ability to display dynamic media.

Street furniture is made up of formats such as bus shelters, traffic barriers, traffic signs, street signs, waste receptacles, news racks, mall kiosks, and telephone booth advertising among others. This form of outdoor advertising is mainly seen in urban centers.

Transit advertising is typically advertising placed on anything which moves, such as buses, subway advertising, truck side, and taxis, but also includes fixed static and electronic advertising at train and bus stations and platforms. Airport advertising, which helps businesses address an audience while traveling, is also included in this category.

Alternative advertising includes ads in stadiums, on gas pumps, bike racks, rest areas, and other non-traditional formats. Alternative advertising provides a way to address consumers in places they may not expect.

PRIOR ART

Tremendous attention has been paid to various niche facets of out-of-home advertising in order to maximize the impact that such forms would have on the ultimate user needs of greater visibility and greater sales. However, such methods have traditionally focused on revenue generation, utilization of web based advertising models to ensure targeted content delivery, new materials and processes for enhancing the aesthetic/appeal of such advertisements. While there are established and mature models for measuring effectiveness of several forms of media, there is a lack of good effective models for outdoor media. As a result, significant challenges are faced by advertisers when determining and deploying outdoor advertising strategies for their products.

While there is a need for an effective and efficient model for outdoor media, one of the significant challenges resides in the variation in the parameters depending on the country where the media is located, the form of the media, the heterogeneous nature of the markets, the fragmented nature of the vendor base, non-uniform structures for the media form, and the absence of an organized measurement methodology. As a simple example, the provision of billboards and the manner in which they are located vary between different parts of India. Typically, the billboards tend to be larger and more spaced apart on the highways, and tend to be smaller in size and more clustered within cities. Even here, the clustering of billboards in cities in India is a function of the space available as well as various municipal regulations. Thus, an advertiser wishing to use one of these assets is vying for eyeball content with other media assets, and possibly of competing products. The wide variation that is observed in India can be found to exist to a substantial extent in other countries as well.

Several attempts have been made to address the need for providing an efficient and effective outdoor media measurement methodology.

For example, KR 20090117185 discloses a system and a method for advertising at affiliated stores. A recording medium is provided to profit from advertising through the use of outdoor advertising media at affiliated stores by relaying advertisements to the outdoor advertising medium. The system of this document comprises a storage medium unit to store information containing affiliated store information for displaying advertisements, advertisement display medium information, and advertisement display condition information. An advertiser is provided with information of the affiliated store where the advertisement will be displayed, information about the advertising medium, and advertisement display conditions. The advertiser can select an affiliated store using an interface. Advertising data to be displayed in the advertising medium of the affiliated store is received from the advertiser client which is stored in an information storage unit, along with affiliated store information selected by the advertiser client, the advertisement display conditions, and the advertising medium information.

KR 20090011364 discloses a system for researching outdoor advertising effect with a people-counter module server provided to count and store a number of pedestrians and vehicles within an effective range of an outdoor billboard, thereby researching advertising effect for the outdoor billboard. A system for researching outdoor advertising effect using a people-counter module server comprises the following units. A network camera installed in each outdoor billboard senses and photographs an object moving within an effective range of the outdoor billboard. A people-counter module server is connected to the network camera through a network.

WO 2006/115911 discloses a method and system for advertising selection, placement management, payment and delivery in a dynamic, real-time environment wherein the production, listing, procurement, payment, real time management, re-allocation and financial settlement of all types of digital advertising mediums, with optional automated delivery for advertisement and messaging for such ads is performed. The planning, purchasing, delivery and payment for on-line and traditional media advertising is automated, standardized and tracked across multiple mediums, such as TV, Internet, satellite, radio, wireless telephone, outdoor screens, and other digital mediums that display dynamic content. As a result, transparency and discovery of price, performance and availability segmented by specific markets and customer profiles for specific products is achieved. A buyer/seller real time feedback is provided to allow both buyers and sellers to dynamically change existing ads, ad space, prices, etc., in a real time environment based on real time sale/conversion feedback.

US Patent Publication 2002097193 relates generally to outdoor advertising and, more particularly, to a system and method of displaying advertising information on a vehicle for creating an efficient mobile outdoor-advertising medium.

Attention has however, not been paid to providing a reliable system by which the planning, execution and implementation of advertisements in the out-of home segment can be optimized in order to ensure advertiser (user) needs using a systematic and coherent methodology. The methods that tend to be employed are still empirical and subject to wide variations between perceived target audience and real target audience. A simple example would be where data is collected using mean traffic flow at a particular locus, there is no assurance backed by reliable data that this mean would remain the average mean. Variations can occur depending on time of day, traffic obstructions/diversions, etc.

As has been noted above, outdoor advertising is a rapidly expanding segment in advertising industry. While outdoor advertising continues to grow at an exponential speed, the supply of traditional outdoor advertising inventory is shrinking and the increased profitability in outdoor advertising is primarily the result of higher prices of advertisements. For example, many municipalities have limited the number of billboards that can be placed within certain areas of the municipalities. Consequently, the supply of the traditionally fixed outdoor advertising inventory cannot catch up with the demand of outdoor advertising. In response to the limitation of the traditionally fixed outdoor advertising inventory, mobile outdoor advertising became more and more popular over the last decade because it provides virtually unlimited supply of moving billboards to a target market that is in need of additional outdoor advertising supply.

Conventionally, mobile advertisements or fleet graphics have been applied to commercial or personal vehicles of employees of a company that the messages they are advertising refer to. The messages or advertisements are applied on the vehicle with paint or, more recently, with adhesive vinyl-based materials. Over the last decade, the vinyl adhesive industry has improved graphic quality of advertisements printed on the vinyl films and has also improved the durability and handling properties of the vinyl films to make them the most widely-used media of producing outdoor advertisements and, in particular, vehicle graphics.

Conventionally, the advertising industry determines the effectiveness and a cost-per-impression (CPM) of traditional fixed-structure outdoor advertising, like a roadside billboard, by counting the number of people or vehicles that pass by the display. Based on data collected, each year the advertising industry publishes a book listing the impression rate data of selected locations. Likewise, the annual operational and other statistical or surveyed data of vehicles and/or operators of the vehicles are collected by the advertising industry. The data is then used against routes that the vehicles (e.g., the buses, taxis, trucks and/or cars) take in order to compile an estimate of impression rate for the mobile advertisement of the vehicles.

A principal problem with such conventional determination system is that much of the data gathered from vehicles or vehicle operators is not verifiable or even reliable. Moreover, existing records of these data contain only minimal and incomplete information. In other words, the current mobile outdoor advertising rating system is primarily based on a guessing game. None of the data obtained through the conventional determination system can reliably predict manners and/or locations of future operation of the vehicles. Accordingly, due to the limited amount of currently accumulated data and the minimal evidential value of the collected data towards computation of accurate impression rates in mobile outdoor advertising, the advertising industry has a long-felt need to improve the conventional mobile-advertising determination system. Specifically, the advertising industry needs a better determination system for accumulating more reliable and accurate data with a highly relevant evidential value towards more correctly predicting the operating characteristics of a vehicle at all times.

In addition, there is an overwhelming need to provide a business the ability to communicate in real-time to the general public or its target markets when it has idle services, overabundant products, or product capacities, etc. The current media and advertising methods fail to provide that real-time communication capability. Only recently are attempts being made to reduce this gap by the introduction of the real-time postings, sales, and bidding sites for idle capacities or products on the Internet. However, this limited real-time communication capability on the Internet is only a minor and partial solution to modern business needs of many companies.

Modern electronic systems installed in vehicles are often adaptable for obtaining desired vehicle operating data. For example, many electronic vehicle-tracking systems installed in vehicles have already been widely used in monitoring the exact locations of the vehicles at any given time. Typically, an electronic vehicle-tracking system uses a communication link with one or more satellite navigation systems for providing information describing a vehicle's location based upon electronic navigation signals. When such positioning information is combined with roadmaps in an expert system, the vehicle location, the speed of the vehicle and the route taken by the vehicle are all instantly ascertainable. Such vehicle operating information is valuable and relevant to the mobile outdoor advertising. For instance, it can be used to more accurately determine when and where to display an advertisement, to qualify vehicles and vehicle drivers, to identify a rate of charge to an advertiser, and to identify a rate of compensation to a vehicle owner or operator for displaying the advertisement. However, none of the conventional mobile advertising system has fully utilized the electronic vehicle-tracking system for mobile advertising purposes. On the other hand, mere vehicle specific data alone, though, will not provide adequate data particularly relevant to what advertisement should be displayed or to the impression rate the advertisement received unless the data is combined with other relevant demographic and geographic data in an expert system which is capable of assessing and matching a vehicle and operator profile against an advertiser's profile, and then using the industry standards to calculate impression rates.

Companies that are planning an advertising campaign typically first create a marketing plan. This is followed by creating a plan of action to implement the marketing plan. The advertising budget is included within the cost analysis of the marketing plan. As a result, there is a need for a system and/or method which would enable higher impact from the advertiser's point of view, while working within limited budgets. Studies are then carried out to determine and understand the target audience, and then ad content is created keeping the target audience as a focal point. At this point of time, the specific media forms for advertising are selected—TV, internet, billboard, etc. and the ads released, and the media monitored for compliance. The results of the campaign are measured in terms of net sales of the product from point of time of release of advertisement to closure/change of campaign.

A business looking into out of home advertising will generally need to recruit the skills of both a creative agency to design the creative content, and a media planning agency. The media planning agency is tasked with providing the outdoor buying specialists and organizing the billboard advertising campaign. This schema is depicted below:

The company would need to interact with all these agencies in order to coordinate a campaign. This is a complex, and often inefficient, process and may be cost prohibitive to smaller companies that operate on a tight budget. Additionally companies will not have decision making points in relation to demographics and other statistics that help form the core of the campaign.

OBJECTS OF THE INVENTION

The primary object of the invention is to provide a system and a method by which out-of-home advertisement assets can be managed effectively and efficiently, thereby providing greater eyeball coverage for an advertiser.

It is another object of the invention to provide a dynamic system by which advertisement content on out-of-home media such as billboards, kiosks, other street furniture, mobile media such as taxicabs, buses, trains, etc., can be managed in a manner whereby an advertiser is provided a greater variety of choice of media depending on the product and its target audience.

It is yet another object of the invention to provide a system and method for online measurement, planning, monitoring and execution of out of home media assets in an efficient and economical manner.

It is a further object of the invention to improve the arbitrary and unreliable problems of conventional outdoor mobile advertising so as to provide a more effective outdoor mobile advertising.

Additional objects and advantages of the present invention will be set forth in the descriptions which follow, and in part will be obvious from the description, or may be learned by practice of the present invention. The objects and advantages of the present invention may be realized and obtained by means of the instrumentalities and combinations particularly pointed out in the appended claims.

SUMMARY OF THE INVENTION

Accordingly, the present invention provides a system for effective measurement, planning, monitoring, and execution of out-of-home media assets for advertisements, the system comprising:

A. a data mapping module provided to enable:
  (a) mapping one or more geographical areas to determine presence of and obtain image data of out-of-home media assets present in said area (s);
  (b) carrying out sampling at determined key location(s) or junction(s) in said area(s) to obtain static or dynamic image data;
  (c) collating and tagging the image data obtained in step (a);
  (d) compiling the image data of step (c) and the image data of step (b) to obtain a comprehensive image product;
B. a data analysis module provided to enable:
  (e) subjecting the image product of step (d) to extensive traffic analysis in order to categorise contents thereof based on key data points;

C. a requirement fit module provided to enable
   (f) obtaining an advertisement requirement kit from one or more prospective advertiser(s) to determine key advertising requirements;
   (g) mapping the advertisement requirements of said one or more prospective advertiser(s) to the image data product of step (d).

In another embodiment, the invention also provides a method for effective measurement, planning, monitoring, and execution of out-of-home media assets for advertisements, the method comprising:
   (a) mapping one or more geographical areas to determine presence of and obtain image data of out-of-home media assets present in said area (s);
   (b) carrying out sampling at determined key location(s) or junction(s) in said area(s) to obtain static or dynamic image data;
   (c) collating and tagging the image data obtained in step (a);
   (d) compiling the image data of step (c) and the image data of step (b) to obtain a comprehensive image product;
   (e) subjecting the image product of step (d) to extensive traffic analysis in order to categorise contents thereof based on key data points; and
   (f) obtaining an advertisement requirement kit from one or more prospective advertiser(s) to determine key advertising requirements;
   (g) mapping the advertisement requirements of said one or more prospective advertiser(s) to the image data product of step (d).

Additional embodiments and variations will be clear from the following description of the drawings and the detailed written description of the invention. In the present invention, it must be understood that the term traffic is generally used to refer to vehicular traffic, but in the context of a given description includes pedestrian traffic as well.

BRIEF DESCRIPTION OF THE ACCOMPANYING DRAWINGS

DETAILED DESCRIPTION OF THE INVENTION

Figure 1:
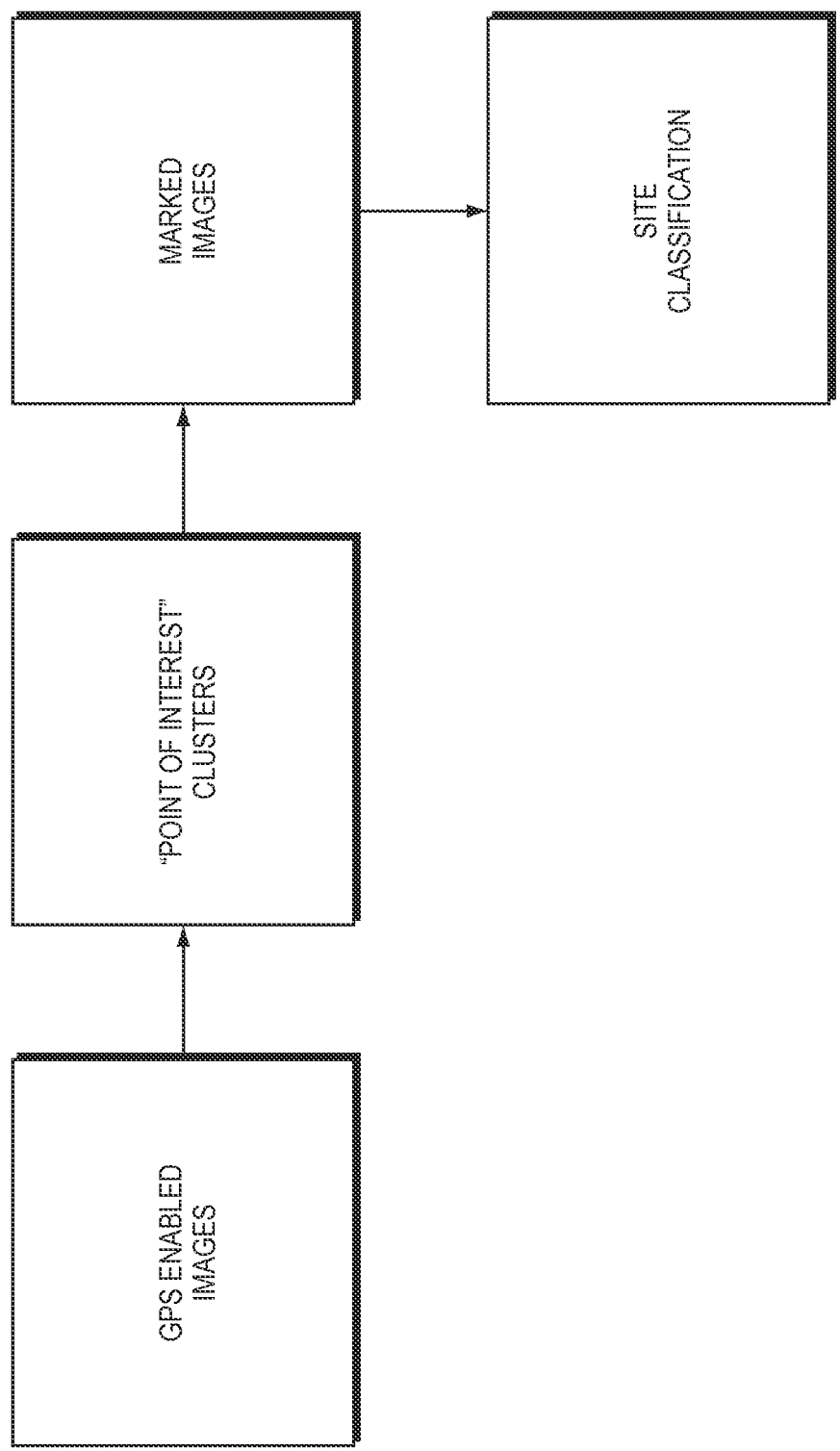
FIG. 1 is a process flow sheet representative of the part of the invention applicable to the processing of GPS tagged data (images or video frames) that is collected.

The present invention allows advertisers to not only customize their individual advertising needs but also select, implement and monitor them.

The process of the invention enables the capture, recognition, collection, and tagging of various out-of-home potential advertisement locations (hereinafter referred to as assets) into a searchable database using high-fidelity video technology. This database is further combined with demographic and traffic data which is obtained by sampling at key geographical points and processes the sampled data into meaningful results.

Entities interested in advertising are provided the necessary access to the database that enables them to demographically profile their target audience and choose the specific assets that are most relevant to this selected targeted audience. This result can be narrowed down by filtering for budget and specific geographies to obtain a targeted advertising set. The advertisers would be able to simulate and visualize how their creative would look on an actual out of home asset in the database, which selection is then passed on to the system for deployment.

The system then validates these assets and confirms availability with the respective media owners and reverts back to the customers with actual availability. Customers then choose the media that they wish to deploy on and pass it along to the system to complete the transaction with the media owners. The system provides the customer the option of also choosing from a set of creative vendors in case customer does not have their advertising matter available. The system can dynamically retrieve data. As a result, the customer is provided the facility of utilizing the system to display, on the same asset, multiple advertisement content at different points of time, or even simultaneously, depending on the target audience profile.

Once the campaign is deployed the system provides customers alerts on their active campaigns. The system enables customers to monitor the progress of their campaigns and assure them of compliance and deployment as per contracted terms.

The invention will now be described with reference to the accompanying illustrative and non-limiting drawings.

Data collection on various out-of home assets is carried out with one or more high fidelity video cameras outfitted with a GPS sensor as the basic data collection mechanism. The data collection unit can be a vehicular mechanism such as a motorcycle rider with a camera attached to his/her helmet. The person drives on a predetermined or if desired, even a random pattern, and collects detailed video images of out of home assets in the driven path. The GPS data is then woven into the video data. This video data is processed to mark and isolate the out of home asset while identifying it with a unique id and tagging it with its GPS coordinates from the video. A small segment of video containing the asset is attached to its database entry together with a static image obtained from a frame grab of the high fidelity video.

The system allows an administrative user to cut out the actual ad on the asset in a series of frames on the video and turn the asset into a blackboard where the customer created content can be inserted in order to be simulated in a drive by video. An in-house media manager then updates the database with all other relevant information for the out of home media asset.

The system provides a mechanism by which a data collection team travels to pre-selected major traffic intersections (determined in part on the data collected as described above) and obtains high fidelity video data from these intersections. This video is processed to extract relevant demographic and vehicular/pedestrian traffic data. The data can be based on parameters such as stereotyping of vehicular passengers, vehicle numbers, vehicle types and models etc. to determine the demographic and economic profile of the target audience at a specific locus. As will be evident, sampling at varying points of time enables greater reliability regarding the information that is collected.

Figure 2:
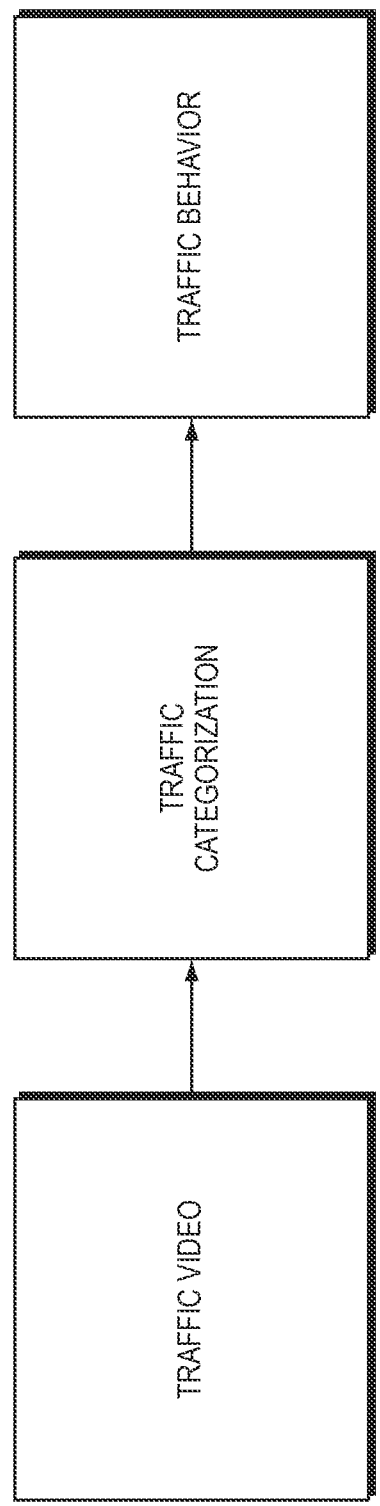
FIG. 2 is a process flow sheet representative of the part of the invention applicable to processing of video traffic data to enable traffic categorization and analyse traffic behavior.

The initial processing of GPS data is intended to catalog and classify the sites across a wide geographical area. This process goes through the following steps as shown in FIG. 1:

1. The data is initially collected through a number of runs along pre-defined routes, resulting in large, GPS-tagged videos of the assets under consideration.
2. The GPS-tagged video is enhanced with ooh-cluster markers which are defined (a) by data entry personnel that view the videos, (b) by GPS loggers that are carried by the video personnel (c) pre-defined points gleaned from maps or previous runs
3. The point-of-interest markers are combined using a "nearness" algorithm, and videos (about 30 second to either side) of the clusters are then isolated, stripped and deconstructed using video processing algorithms.
4. The deconstructed videos are then tagged using an online processing module where boundaries of each asset are marked on specific video frames. The co-ordinates of asset boundaries in the remaining frames are extrapolated from the marked frames, and where the extrapolation does not provide an accurate overlay, additional tagging is done till the boundaries appear acceptable.
5. The assets are given unique ids and stored in the database.
6. The assets are viewed by a local expert who provides the following additional information (a) size and type of the asset (b) owner (c) special characteristics Video traffic data is collected on a periodic basis at various intersections and used to create traffic and exposure models for users. Extensive traffic videos are collected (GPS tagged as well) at various hours at pre-defined intersections and traffic locations. The following process (as shown in FIG. 2) is then used:

1. The traffic video is loaded into an analysis module
2. Traffic analysis personnel then perform a frame-by-frame analysis of the data, categorizing vehicles, pedestrians and occupants of vehicles based on a number of factors ranging from age, perceived income levels, appearance, clothing, physical fitness and relevant characteristics.
3. In addition, various behavioral parameters are gathered such as the wait at a signal, obstruction of view, attention to traffic, perceived time pressure etc.

Figure 3:
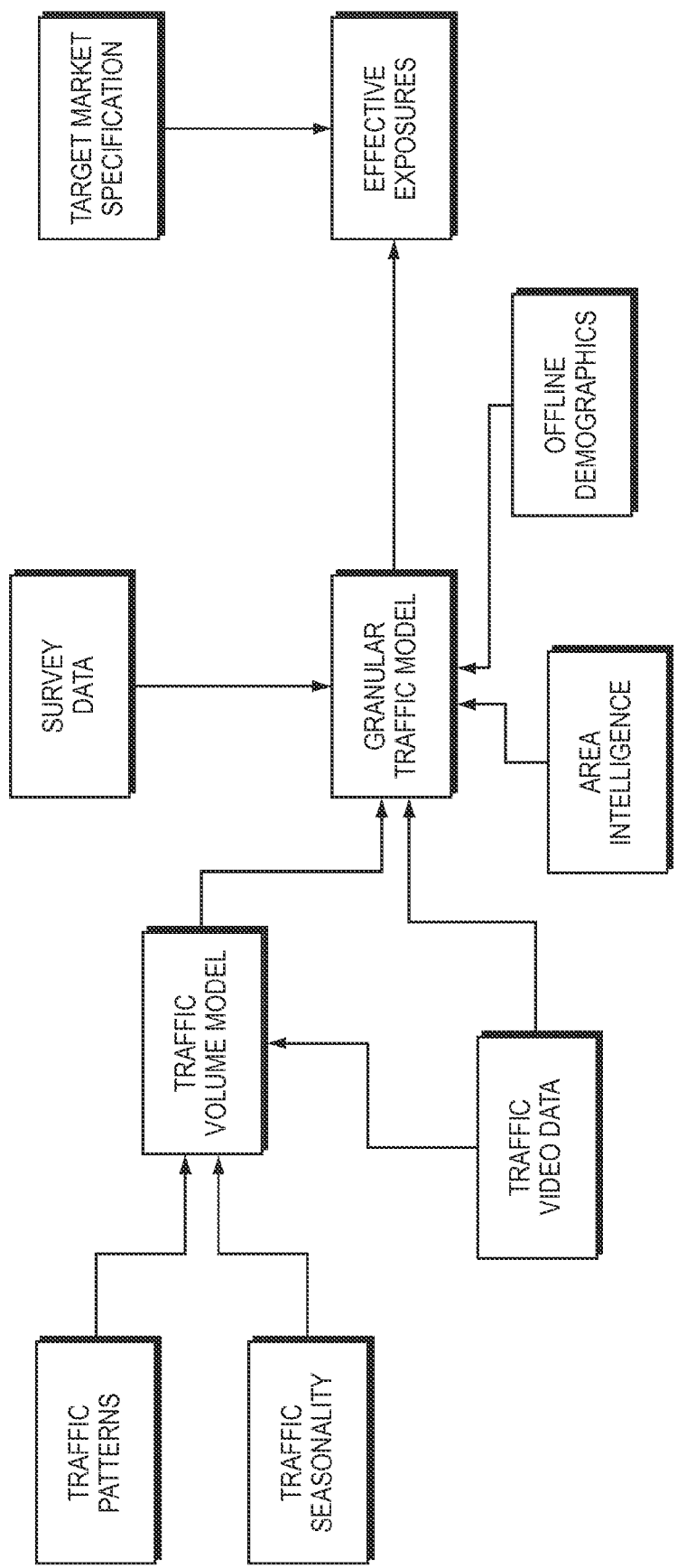
FIG. 3 is a process flow sheet representative of a granular traffic model that is employed in one embodiment of the invention to analyse demographic and vehicular data.

The demographic and vehicular data model that is preferably used is the granular traffic model depicted in FIG. 3. The granular traffic model results in effective exposures for each site, and enables prediction based on user demographics and behavior, the number of total exposure per asset. The specific processes that define these are:

1. Traffic patterns. For each junction/segment of road, build a queuing network model that predicts rate of entry/exit at various points. This allows determination in greater detail, the specific demographics of the occupants as well as their projected purpose.
2. Traffic seasonality. India, particularly, is significantly affected by seasonality in terms of traffic movements—monsoons, festivals, holidays etc. Seasonality model will play a further role in determining volume across traffic interest points.
3. Traffic Video Data. Traffic video that is collected will be put together and analyzed. There will be clear categorization of vehicles, their occupants and pedestrians—this classification will be to a level of granularity that delves into perceived age, economic status, physical characteristics, style of dressing etc.
4. Traffic Volume model. The data from the above sources are combined to create a predictive model of traffic volumes. This model is comprehensive in routing and directionality.
5. Granular Traffic Model. The volume model and the video classifications are combined, along with demographic and survey data to create a Bayesian model of traffic flow, which predicts patterns and behavior for any demographic segment that is observed to frequent the traffic interest point.
6. Target Market Specification. The target market is specified by using an elicitation algorithm, which allows the user to categorize randomly generated profiles as potential purchasers or influencers. This will allow the application to generate a target profile based on several demographics.
7. Effective Exposures. This narrowed down profile is used in conjunction with the granular traffic data to generate Exposures per unit time for the profile.

Figure 4:
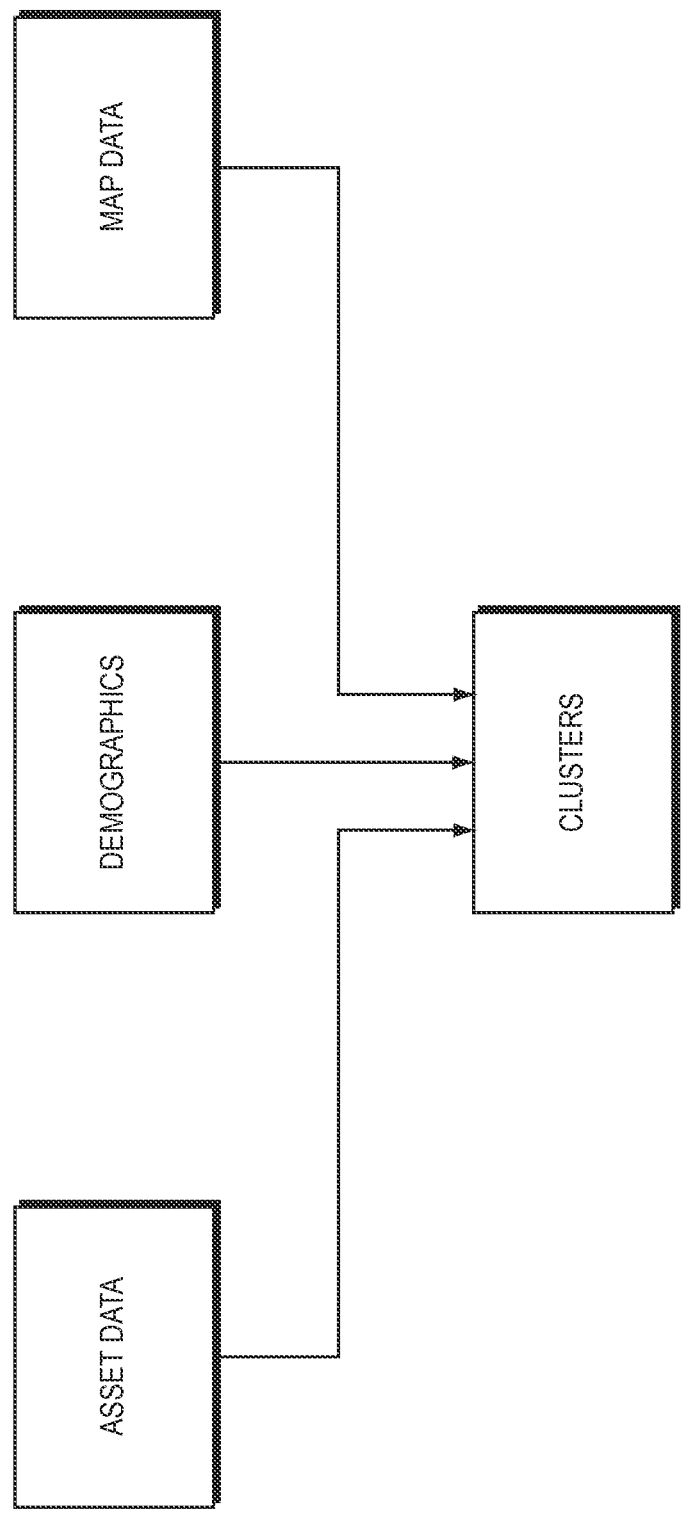
FIG. 4 is a process flow sheet representative of the formation of clusters in a dynamic mode using geographic proximity and demographic similarity.

The challenge of wading through vast amounts of data to create an effective plan is primarily cognitive—it is difficult to visualize over 100,000 assets in India alone, and possibly over 2,000,000 world-wide. Cluster based navigation is then provided for the users within the application since this would provide the best available method of evaluation of data. The clusters are dynamically defined based on geographic proximity and similarity of demographics. This is depicted in FIG. 4.

Clustering is done using the following process:

1. Collect asset data and demographics
2. Collect map data with geographical boundaries
3. Create clusters using geographic proximity and demographic similarity and asset similarity data
4. Roll up clusters so that user can drill down easily and with a high degree of specificity.

Figure 5:
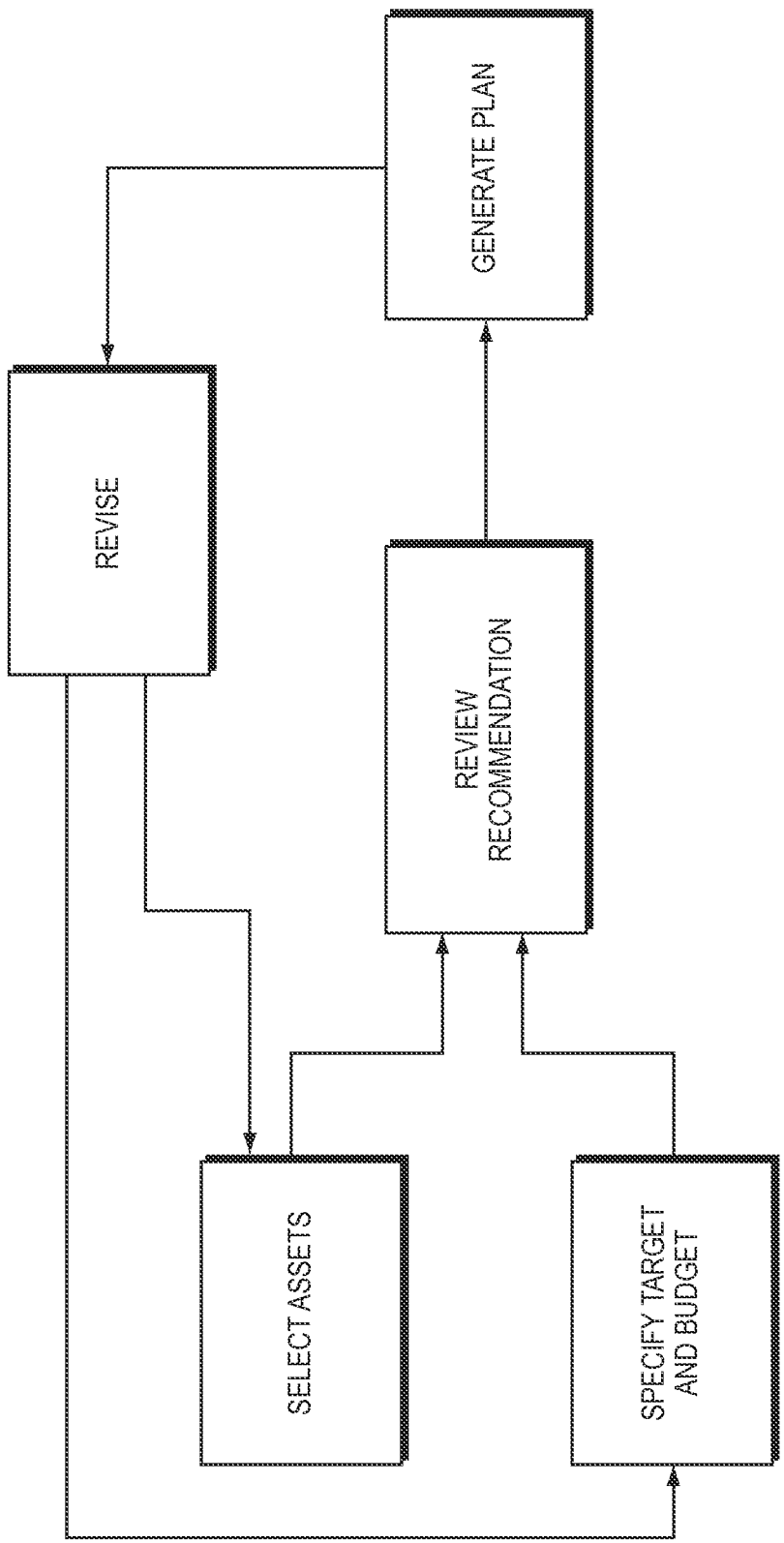
FIG. 5 is a process flow sheet representative of the mode by which search and online media planning is carried out in one embodiment of the invention.

The application enables the user/customer to do sophisticated media planning. This is depicted in FIG. 5. The specific steps are explained below:

1. Select assets or types of assets, and geographies
2. Select target segment and budget available
3. Have the system recommend specific assets to purchase/advertise on
4. Revise and refine assets
5. Generate a well-documented plan.

Figure 6:
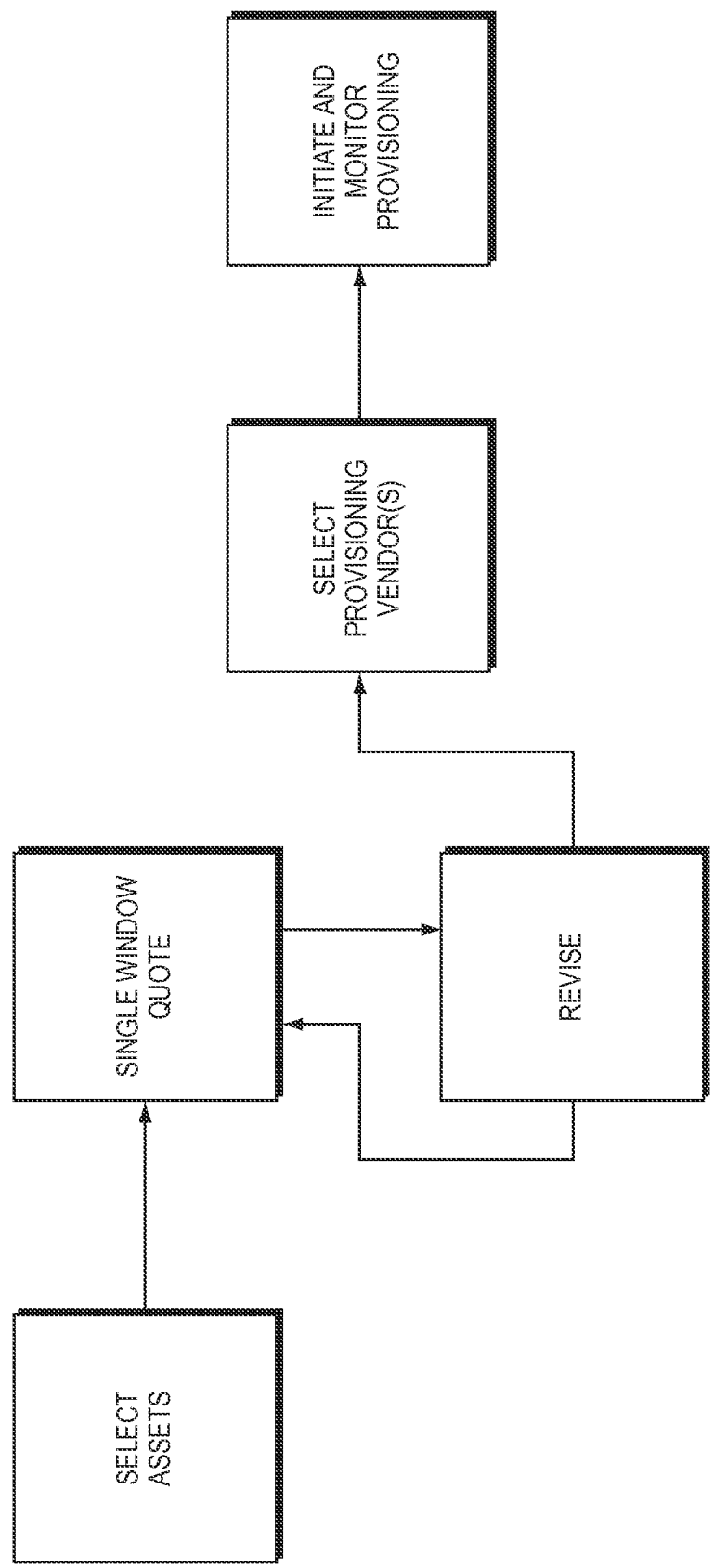
FIG. 6 is a process flow sheet setting out how in one embodiment, users are enabled to first select assets followed by provisioning with content.

The system is enabled as shown in FIG. 6 using the following protocol:
1. The user selects assets that they are interested in
2. User provides the assets specifically or as pointers in a request to a single window system
3. A rated provider follows up and generates a single quote with characteristics for the user
4. Once the assets are selected and contracted, the user can engage with a provisioning vendor and initiate/monitor process—including printing of material, production, and deployment on the assets.

Figure 7:
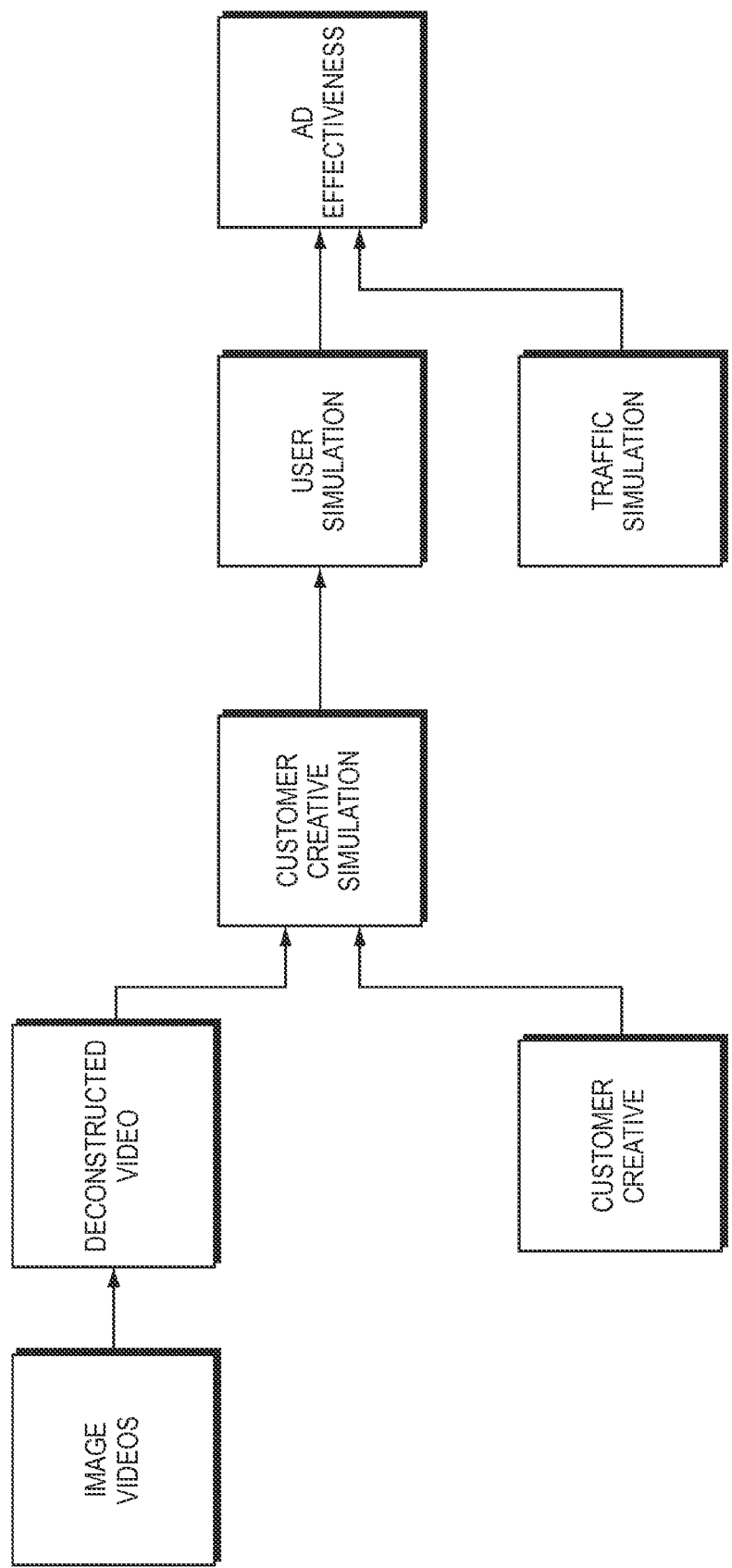
FIG. 7 is a process flow sheet setting out one embodiment of the invention where simulation functionality is provided for the customer.

Simulation functionality is provided in the system such that the user/customer can determine with a high level of accuracy, the final impact of the campaign before the ad is deployed. This is depicted in FIG. 7 and involves the multiple steps shown below:
1. The image videos collected in earlier stages are tagged, marked and deconstructed.
2. Customer creative provided for simulation are then stitched back into the deconstructed video to generate full drive by simulations of the new creative
3. The new creative are then exposed to a variety of users to measure effectiveness
4. The effectiveness data gathered from the users are combined with traffic data to simulate actual effectiveness of the ads.
5. Multiple creative can be tested at the same time to allow the selection of the best possible strategy.

The system and method of the invention will now be explained further with reference to a specific validation exercise that was carried out by applicants over the southern part of India.

The system of the invention essentially comprises of three parts:
(a) Collection and collation of data
(b) Analysis of demographics and eyeballs; and
(c) Analysis of advertising requirements and their fit with media assets that are available.

Figure 8:
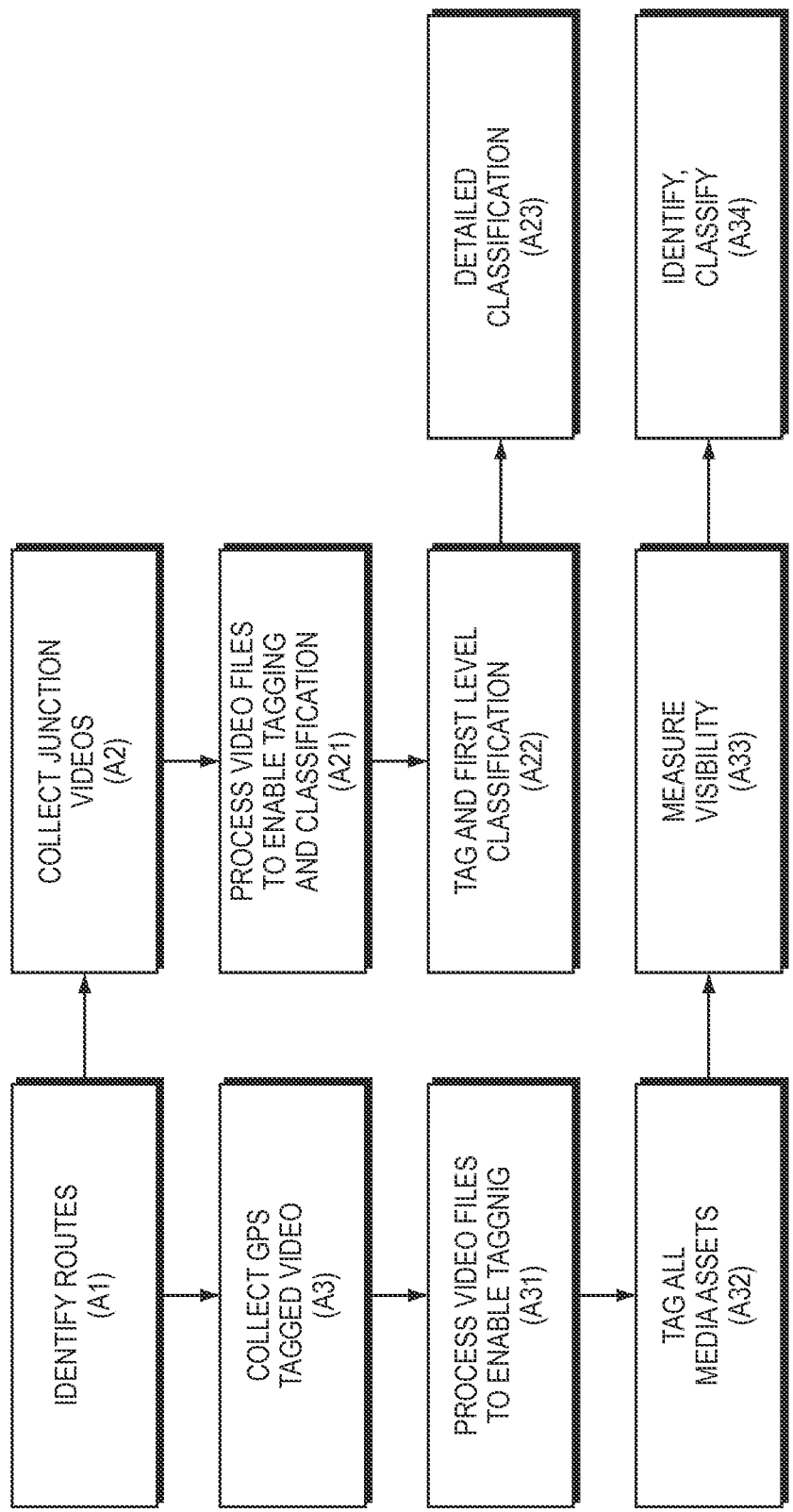
FIG. 8 is a process flow sheet representative of the part of the invention applicable to the collection and collation of data relating media assets.

FIG. 8 is a process flow sheet representative of the part of the invention applicable to the collection and collation of data relating media assets. The specific media assets that are exemplified are billboards. The method with minor modification would be equally applicable to other assets such as out-of-home furniture such as bus shelters, kiosks, train stations, etc. The collection and collation of data follows the process described below.

As a first step, the area where data is to be collected is mapped. This is covered in the block identified as A1 in FIG. 8. Mapping can be done by identifying the specific geographical areas and routes where potential advertisement locations are present, and if desired arranging the routes in order of importance. As an example, the test run to validate the present invention was carried out in the southern part of India, which comprises of four large states of Tamil Nadu, Karnataka, Andhra Pradesh and the Union Territory (Special Status State) of Pondicherry. The entire area was first mapped, and Tier 1, 2 and 3 cities were identified. Important and significant thoroughfares in each city were categorized and mapped. This included the process of mapping major highways that connect the various cities. In the example carried out to validate the invention, this mapping involved over 8500 Km of roadways that would normally be travelled.

As is evident, this example carried out over four southern states in India can be replicated in any jurisdiction. These routes are then analysed using an optimal routing algorithm in order to minimize the time and effort of data collection. After the mapping, specific junctions and locations can be identified, where traffic videos are to be collected. In the example of the invention, over 900 junctions and locations were identified where traffic videos were to be collected.

The routing algorithm that is used comprises a proprietary algorithm which determines what routes to cover and in what order. Specifically, the algorithm comprises:
1. Creation of a list of junctions
2. Creation of clusters of junctions so that each cluster is no larger than 30 square kilometers. The initial starting set is created using a simple rule—for each junction, find a cluster that it could fit in while still keeping the cluster area below 30 sq. km. If no cluster is found, create a new cluster with the junction as the only member.
3. For each cluster, evaluation of possible routes within the cluster to estimate the travel time.
4. Reassigning junctions to clusters and evaluation if the reassignment improves the overall travel time.
5. Cessation of process when no further improvements exist.

The next step of the method involved collection of videos of traffic junctions, and/or of traffic routes. This is exemplified in block A3 of FIG. 8. The video collection mechanism is built using technologies that are readily available. However, the assembly of the mechanism has to the applicants' knowledge not been done in the manner so far. A GPS enabled high fidelity video camera was mounted on a motorcycle helmet. Multiple stability tests and adjustments were carried out to ensure that consistent video was available to process. The testing involved methods, such as dropping the helmet from a given height, at which a motorcycle rider would normally wear the helmet, vigorously and continuously shaking the helmet, etc. In addition, a portable battery pack was added to the camera to ensure longer life of the camera. The videos across the routes were collected in multiple runs with two riders, and at different points of time. However, as is evident, more than two riders can be used, and the riders can travel in tandem. Weekly collection mechanisms were devised since the collected files were large. This involved transportation of the media physically to a central office.

Block A3 can be carried out in addition to or alternatively replaced with the process identified in the block labeled A2. This additional or alternative methodology involved obtaining stationary snippets on video of pre-determined junctions or locations. The example of the invention involved taking snippets for 15 minutes at a time at pre-determined times throughout the day. This was done so that the sampling at any given junction or location was representative of the traffic movement through the day. The hardware and personnel used for collection of junction videos was identical to that for tagged videos. The process of using mobile cams mounted on helmets in steps A2 and A3 was done after taking cost considerations into account. However, where the cost of manual collection exceeds the cost of individual cams mounted at/near junctions/media assets/points of interest, this methodology can be tuned to collect such data and use it in all following steps.

Block A21 identifies the methodology of video file processing to enable tagging and classification. The videos whether collected through block A3 or A2 were in .mov format. These were converted to .flv format to enable web processing. The process of conversion was done using FFMPEG, which is an open-source video processing software. However, other conventional conversion software can also be utilized. The video(s) were further partitioned into individual images to enable detailed analysis of vehicular and pedestrian traffic.

The process of tagging was accompanied by at least a first level classification, in the manner set out in block A22. The junction videos were processed using a custom built web interface built using a node.js application, with a database repository built using couchdb (a no-SQL database). This allows the data model to be flexible and allows the modeling of an arbitrary number of parameters for the tagged pedestrians and vehicles.

During this stage of processing, all unique vehicles and pedestrians were tagged and first level classification (pedestrian, car, bus, two wheeled vehicles such as scooters and motorcycles, auto-rickshaw, bicycle, commercial vehicle) were done.

The second level of classification is as set out in block A23. This involved a detailed classification, wherein, for example, for each junction video, a representative sample of tagged pedestrians and vehicles were selected randomly for detailed analysis. For pedestrians, various parameters such as age, appearance, clothing, height and weight as well as specific personal attributes such as spectacles, presence of and amount of hair etc. are collected. For vehicular traffic, the parameters involve make and model, color, condition and if visible, state of origin (from license plates).

In addition, for each vehicle, direction of travel is also categorized. The resulting data is stored in the database for further analysis. Over 450,000 pedestrians and vehicles were analyzed in detail in this effort.

Block A31 details video processing but for traffic videos obtained by the use of motorcycle riders. The video processing done here was identical to that carried out in block A21, except that for individual images, GPS co-ordinates were extrapolated for each individual image.

All media assets were tagged in accordance with block A32, using a custom built application on a node.js/couchdb platform. The example of the invention involved tagging over 43000 assets in South India. This information regarding location and image data was then stored in the repository.

In block A33, each tagged media asset was further analysed and the following data recorded—size, distance of visibility, obstructions, clutter, angle, height, current advertisement, illumination levels or whether the asset is non-illuminated, and the mode of mounting of the asset.

Figure 9:
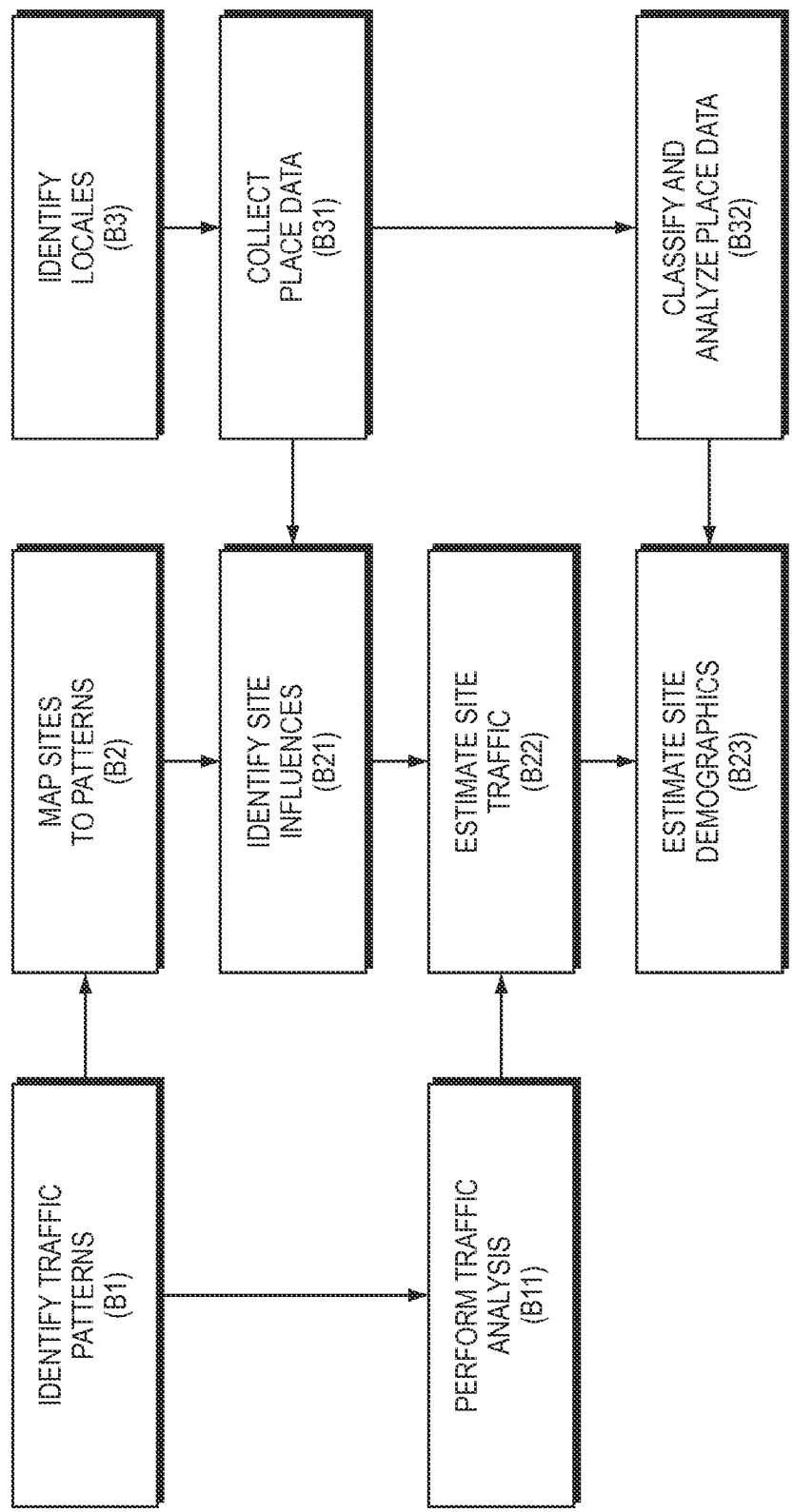
FIG. 9 is a process flow sheet representative of the part of the invention applicable to analysis of demographics and "eyeballs" of the media asset.

FIG. 9 sets out the process flow sheet applicable to the analysis of demographics and 'per-view' or 'eyeballs' of the media asset.

The analysis of demographics and eyeballs was done as follows. Firstly, the traffic patterns in a given city were identified. This involved identification of the major thoroughfares and how the thoroughfares affect traffic through a junction. This provides us a network structure to analyze traffic patterns. An example network is given in FIG. 10. As can be seen from FIG. 10, measurements of traffic at some of the junctions are taken and categorized into multiple demographic segments. However, the "IN" and "OUT" measurements of traffic entering and exiting thoroughfares was not known. This is explained in block B1 of FIG. 10.

Traffic analysis is done using a steepest descent estimation model overlaid on a queuing network, as is depicted in block B11. To the best of applicants' knowledge, this has not been attempted previously in literature, probably since traditional traffic analysis is concerned with peak traffic conditions, and not with total eyeball estimates of a media asset through a given period of time. This model was used to carry out measurements at junctions, rather than thoroughfares. While this model is marginally less accurate, it is more cost effective.

The queuing network models were used to analyze longer time aggregates to estimate eyeballs the specific steps of the algorithm are as follows:

1. Start with an estimate of traffic inflows and outflows at each thoroughfare. Any feasible positive numbers are appropriate for the starting value set. The algorithm to determine the right set of numbers converges irrespective of the initial set of feasible numbers. Thus the algorithm could be seeded with all 0's or 1's. However, in order to ensure faster convergence of the algorithm, for each arc, the difference of traffic between junctions on both sides of the arc is used as the initial value for each arc.
2. The network is modeled as a Jackson network where the product form probability of junction traffic holds. A Jackson network is a queuing network where all external arrivals to the network are modeled as Poisson processes, all service times are exponential, every arrival after service at a node proceeds along feasible paths with a given probability, and the utilization of all queues is less than 1. Under these circumstance, the equilibrium probability distribution across all nodes is seen to be a product formula (specified in the above reference) and very tractable to analysis.
3. The estimates are shifted/perturbed infinitesimally in order to determine the effect of each estimate on the objective function. The objective function is defined as the square of the deviations of the estimated junction traffic from the actual.
4. Each estimate is adjusted by an amount proportionate to the partial derivative for the estimate.
5. Steps 3 and 4 above are continued till significant improvements in the objective function are obtained, and then ceased.

The next step involved the identification of locations that contain media assets as shown in block B3. As an arbitrary measure, each location was pre-determined as not exceeding one (1) square kilometer. This was done using a simple algorithm which identifies clusters of media assets and progressively creates locations. At each stage of the algorithm unassigned media assets were identified which were used to further identify clusters, and define further locations. By this method, 1481 locales were identified for Southern India, each of which had more than 5 assets.

Once the locations were identified, place data from various sources available in the market were scraped and collected using extensive algorithms. This is depicted in block B31. Such sources are conventional and generally comprise sources which provide or sell place data and their GPS coordinates. Over 240,000 places such as establishments or landmarks were collected for the 1481 locations.

Block 32 depicts the classification and analysis of place data. Once the places were identified, they were classified across multiple characteristics/types (restaurants, stores, malls, schools, colleges, hospitals etc.), as well as specific brands (McDonalds™, FedEx™, etc.).

The specific GPS and directional information that is already present was used to map each site to the thoroughfares that have been identified in block B1. The methodology is set out in block B2. After the mapping, parameters such as the traffic at site, demographics of the traffic, site characteristics, places within pre-determined distances (100 m, 0.5 km, 1 km and 5 km) were formed into sets to act as identifiers of the influences on each site or location or thoroughfare. This is depicted in block B21.

Specific site traffic was estimated differently depending on whether the site was at a junction or whether the site was on a thoroughfare. If the site was at a junction, traffic was estimated based on the vehicle and pedestrian traffic in directions that enable the media to be viewed. If the site is on a thoroughfare, the traffic was estimated based on the queuing network model. This is depicted in block B22.

Once all the data was in place, a further break-down was performed as is shown in block B23 in order to estimate the eyeballs for each site. This involved the use of a specific algorithm given below:
1. The site traffic is the base figure for the site
2. Use site characteristics to estimate a factor (0.0-1.0) which determines the visibility of the asset. This is based on practical experience of an expert. This site traffic is multiplied by the factor.
3. Use place and locale characteristics to estimate refinements for specific demographics—for instance the proximity of a school may characterize the pedestrian traffic as including a significant number of school goers. This refinement is also performed using expert experience. These refinements are further added to the eyeball estimate
4. This now results in the eyeball estimate for the site.

At the end of this process over 65 characteristics for each site were identified. These include characteristics such as, the total eyeballs per day, total eyeballs per day (>60 age group), total eyeballs per day (driving luxury cars), total eyeballs per day (bald male pedestrians); number of schools in a 500 m radius, shopping area score—on a scale of 1-10, and residential area score—on a scale of 1-10. As will be understood, this list is not exhaustive but is only illustrative of the characteristics that require consideration in the advertising space.

Figure 11:
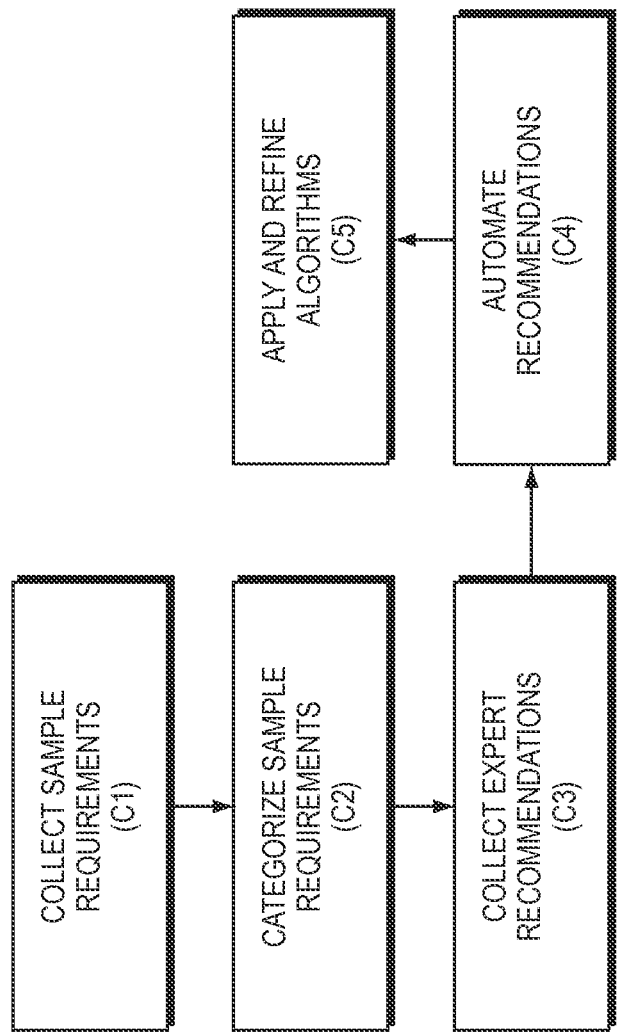
FIG. 11 is a process flow sheet representative of the part of the invention applicable to the mapping of advertisement requirements of specific customers to media assets to minimize eyeball costs.
Figure 12:
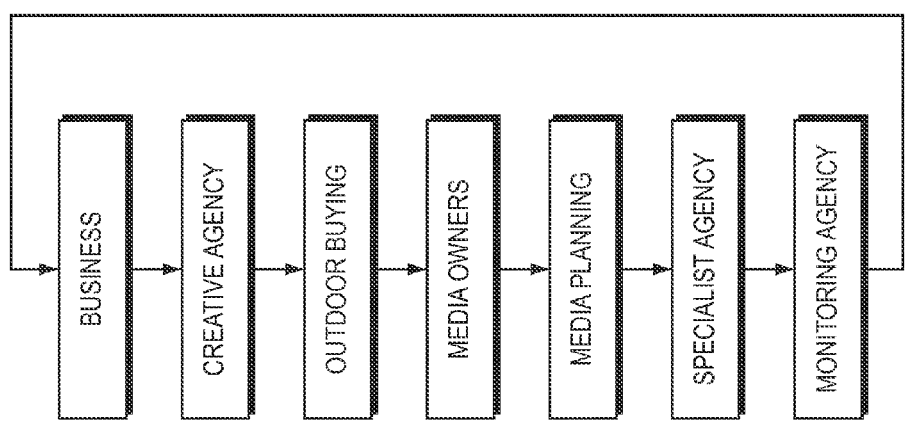
FIG. 12 is a process flow sheet representing a schema for providing outdoor buying specialists and organizing a billboard advertising campaign.

FIG. 11 depicts the analysis of fitting advertising requirements with media assets. After the site traffic and demographics were determined, the next step was to map advertising requirements of specific customers to media assets, so as to minimize eyeball costs.

The first part of this embodiment comprises collection of a set of sample requirements of advertisers, preferably varied over different range of products that are to be advertised. This was done through by targeted demographics and timing. Over 85 specific requirements were collected, primarily from the data collected during the video runs of existing advertisements. Additional samples were generated using the services of experts from the advertising space.

The advertising requirements were then analysed to obtain the specific characteristics of each requirement. Samples of these attributes/characteristics are luxury product score, product category, targeted demographic 1, targeted demographic 2, duration of exposure, and preferred location. This is depicted in block C2. Based on the sample requirements, expert recommendations were collected to identify appropriate assets to advertise on. These were primarily based on existing advertisements and their assets. Additional matches were created in-house. This is depicted in block C3. The requirements, sites and matches were processed through a machine learning algorithm to rank and categorize potential matches for new requirements (block C4). The algorithm logic is as follows:
1. All site characteristics were normalized across the population of sites into a 1-10 scale.
2. For each requirement characteristic, candidate site attributes were identified that would dictate the selection of the site
3. A weighted linear scoring function to rank sites for each requirement was created.
4. The process started with equal weights for each attribute and measured the deviation of recommendations from the rankings by the function.
5. A simple perturbation of the weights was used to measure the impact of changes in weights on the deviation.
6. The weights were modified based on the perturbation results to attempt to improve the objective function
7. Steps 5 and 6 were repeated till there were no significant improvements The weighted function specified in block C4 was used to do further recommendations of new requirements, and the users were then asked to rate the recommendations. Based on the ratings, appropriate refinements were made to block C4.

As will be evident, this model for assessment of out of home assets such as billboards can be extended to mobile media such as trains and buses, and even to stationary outdoor furniture such as kiosks, etc. It can also be extended with minor modification to increasing online media effectiveness with offline media.

Figure 10:
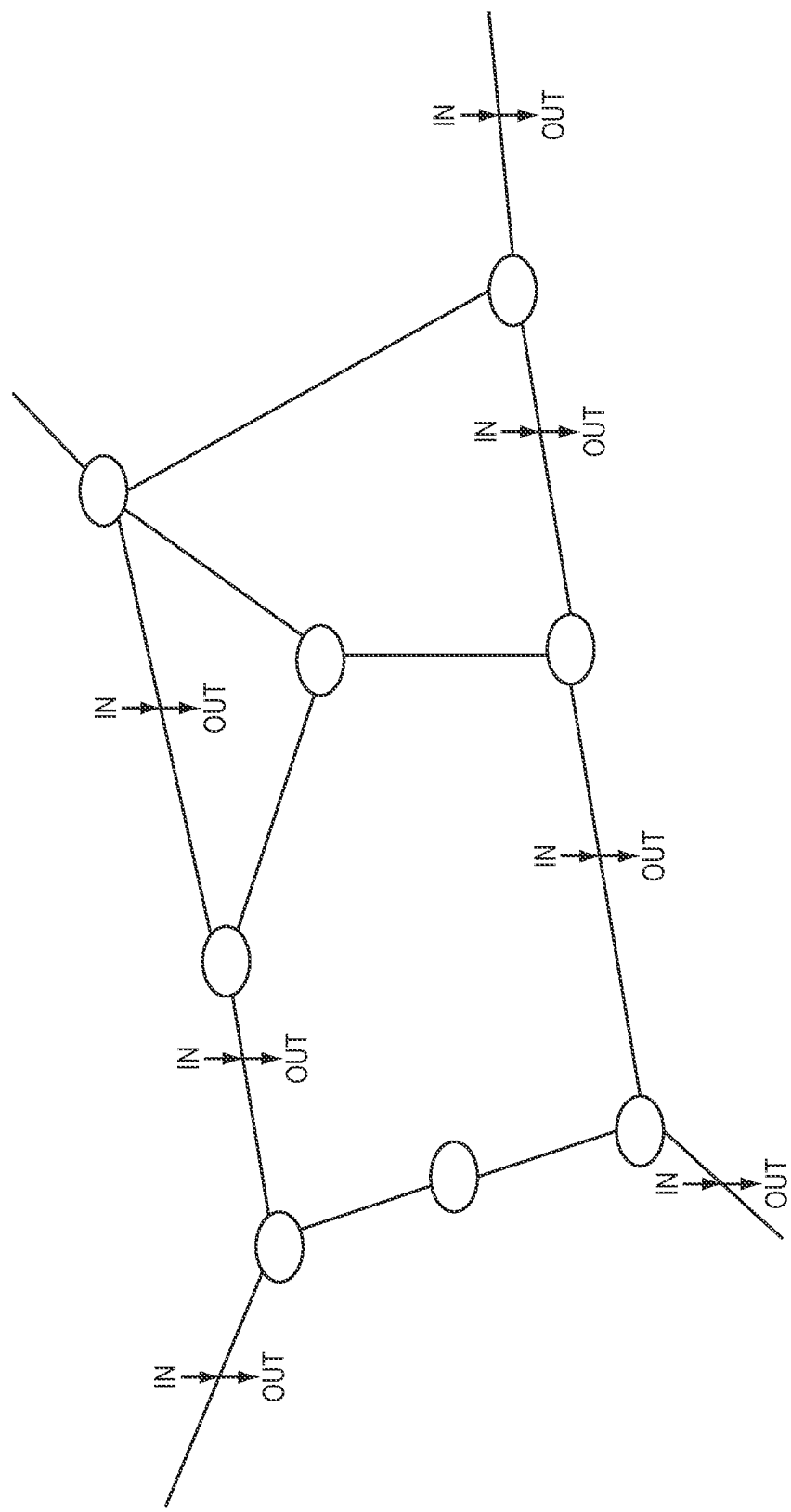
FIG. 10 is a process sheet of a sample network architecture used in the analysis of demographics and eyeballs in order to analyse traffic patterns.

Since the traffic analysis model of FIG. 10 provides appropriate and reasonably accurate information about eyeball density based on traffic location and time, this model can be used to estimate eyeball metrics on static advertisements that are mounted on vehicles. This would require documentation of the projected route of the vehicle. Based on projected route, at each point along the route, the eyeballs can be estimated based on data collected by Algorithm of FIG. 10. The demographics are aggregated for this route, based on vehicle route.

The invention also in one embodiment encompasses moving dynamic advertisements on moving vehicles. This would involve multimedia overlays on moving media. The method then consists of using the projected route to estimate the eyeballs based on data collected by algorithm of FIG. 10. The route is sliced/partitioned to create the maximum number of relevant eyeballs for each advertisement. The advertisements are then alternated and displayed during the route based on the GPS co-ordinates.

The data generated provides a comprehensive overview of place and location metrics. Therefore, the invention is applicable to target previously sub-utilized advertising means such as newspaper inserts, local cable ads. The process for targeting local media consists of identifying the target segments for the advertisements, and then identifying for the vehicle used, the location and place metrics for its reach, and then selecting a mix that optimizes the number of eyeballs.

In another embodiment, the method of the invention involves increasing online media effectiveness through offline media. While online advertisements have become the powerhouse for small and medium businesses, it is becoming increasingly hard to get initial momentum and brand recognition. For online media campaigns, the method consists of:
1. Identify the target segment for the ad
2. Use a "starter" display in a specific segment—estimate eyeballs
3. Phase online ads at specific intervals after the starter display
4. Measure and fine tune clicks per exposure The following is a specific instance of increasing online media effectiveness using offline/outdoor media.
1. Identify geographical target segments—for example Bangalore and Hyderabad. Residents and frequent travelers to these areas are identified by the IP's of the devices that they browse from, and online ad consolidators provide targeted advertising to these locations.
2. An online ad is created that runs in these locations. This should be confined to these metros and the consolidator should be able to provide specifics of the location of the people that have viewed the ad.
3. A starter offline ad is run in specific locations targeting specific demographics. The ads should be clean, focused and provide a clear link to a landing page.
4. Measure the landing page usage, as well as clicks from the surrounding areas for a 1-month timeframe following the launch of the ad.
5. Use specific location and site metrics to estimate the difference in online views with and without the ad, and dependency of these results on timing and demographics.

Variations and modifications of the above description are possible without departing from the spirit and scope of the invention.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

We claim:
1. A system for effective measurement, planning, monitoring, and execution of out-of-home media assets for advertisements, the system comprising:
a data mapping module provided to enable:
mapping one or more geographical areas to determine presence of and obtain image data of out-of-home media assets present in said area(s);
carrying out sampling at determined key location(s) or junction(s) in said area(s) to obtain static or dynamic image data;
collating and tagging the image data obtained in step (a);
compiling the image data of step (c) and the image data of step (b) to obtain a comprehensive image product;
a data analysis module provided to enable:
subjecting the image product of step (d) to extensive traffic analysis in order to categorise contents thereof based on key data points;
a requirement fit module provided to enable obtaining an advertisement requirement kit from one or more prospective advertiser(s) to determine key advertising requirements;
mapping the advertisement requirements of said one or more prospective advertiser(s) to the image data product of step (d).
2. A system according to claim 1, wherein the data mapping module is provided with means to enable mapping in said area(s) along one or more pre-determined route(s) or along one or more random route(s).
3. A system according to claim 1, wherein the mapping module comprises two-wheeled vehicle helmets provided with high fidelity cameras containing GPS mapping means.
4. A system according to claim 1, wherein the sampling at determined key locations is carried out using two-wheeler vehicle helmets provided with high fidelity cameras containing GPS mapping means.
5. A system according to claim 1, wherein mapping module is further provided with means to form clusters of media assets.
6. A system according to claim 5, wherein the means to form clusters comprise GPS loggers.
7. A system according to claim 1, wherein the image data is stored in a database and periodically updated.
8. A system according to claim 1, further comprising deconstruction means to split the image data of running video into separate image frames.

9. A system according to claim 8, further comprising tagging means to provide individual tags to each image frame to identify location and/or time of image.

10. A system according to claim 8, further comprising tagging means to provide individual tags to each media asset located in each specific cluster.

11. A system according to claim 1, wherein data analysis module comprises means to perform frame-by-frame analysis of the image data to categorise data points including traffic patterns along a route, traffic patterns at one or more location(s) and/or one or more junction(s) in a route, number of vehicles, types of vehicles, occupants of vehicles, pedestrian traffic, stationary traffic, and the like.

12. A system according to claim 1, wherein the data analysis module is provided with a queuing network comprising an estimate of the traffic inflow and/or outflow at each route, means to perturb the estimate in specified limits in order to determine the effect of each estimate on an objective function, means to adjust the estimate by a value that is proportionate to the partial derivative of the estimate in order to determine improvements or variations in the objective function.

13. A system according to claim 1, further comprising means to allot unallocated media assets to existing clusters, or utilize unallocated media assets to form a new cluster.

14. A system according to claim 1, wherein the requirement fit module comprises means for mapping advertiser requirements to image data based on a set of pre-determined parameters.

15. A system according to claim 14, wherein the pre-determined parameters is selected from the group comprising 'eyeball' values, size of media asset, location of media asset, size of cluster, location of cluster, pedestrian demographics, vehicular demographics, and size of clutter surrounding a given media asset.

16. A system according to claim 1, further comprising simulation means whereby advertisers are enabled a real time functionality viewing of proposed media content on a proposed media asset.

17. A system according to claim 1, further comprising alert mechanisms to inform advertiser of eyeballs impacted by an advertisement on one or more selected media assets in dynamic mode.

18. A system according to claim 17, wherein said alert mechanism comprises one or more GPS enabled high fidelity camera(s) located on or around the media asset(s).

19. A method for effective measurement, planning, monitoring, and execution of out-of-home media assets for advertisements, the method comprising:
mapping one or more geographical areas to determine presence of and obtain image data of out-of-home media assets present in said area(s);
carrying out sampling at determined key location(s) or junction(s) in said area(s) to obtain static or dynamic image data;
collating and tagging the image data obtained in step (a);
compiling the image data of step (c) and the image data of step (b) to obtain a comprehensive image product;
subjecting the image product of step (d) to extensive traffic analysis in order to categorise contents thereof based on key data points; and
obtaining an advertisement requirement kit from one or more prospective advertiser(s) to determine key advertising requirements;
mapping the advertisement requirements of said one or more prospective advertiser(s) to the image data product of step (d).

20. A method according to claim 19, wherein mapping of one or more geographical areas comprises identification of said one or more geographical areas, categorization of said areas in order of priority based on information on traffic density, mapping routes of travel in said areas, analyzing the selected routes using an optimal routing model.

21. A method according to claim 19, wherein the optimal routing model comprises creation of a list of junctions or locations, creating clusters of such junctions or locations along pre-determined geographical area parameters, evaluating possible routes within each cluster to estimate travel time, and re-assign junctions and/or locations to clusters in order to improve the estimate of overall travel time.

22. A method according to claim 19, wherein the mapping method includes relays of physical travel along identified routes to obtain video image data in mobile mode along said route.

23. A method according to claim 22, wherein said physical travel is done at pre-determined times of the day.

24. A method according to claim 22, wherein said physical travel is done at random intervals during the day.

25. A method according to claim 19, further comprising sampling at determined key locations or junctions in said areas to obtain static or dynamic image data.

26. A method according to claim 25, wherein said sampling is done by individuals positioned at given junctions or locations at different points of time during a day.

27. A method according to claim 25, wherein the image data is obtained by high-fidelity cameras provided with GPS means located on or around a given media asset or in and around a given junction or location.

28. A method according to claim 19, wherein video image data collected during mapping and/or sampling are tagged with GPS location details and time of image.

29. A method according to claim 19, further comprising converting video image files into a form suitable for deconstruction.

30. A method according to claim 29, wherein the video image files are in .mov form and are converted to .flv form.

31. A method according to claim 19, wherein the video images are split into individual frames to enable detailed analysis of vehicle and pedestrian traffic in respect of each image.

32. A method according to claim 19, wherein each video image file is tagged with an individual id.

33. A method according to claim 31, wherein each individual frame and each media asset located in said individual frame are tagged with respective ids.

34. A method according to claim 33, wherein the images are subjected to tagging a first level classification with a web interface using a node.js application and a database repository made using couchdb.

35. A method according to claim 34, wherein the first level classification is carried out using parameters such as type of vehicle, number of occupants, types of pedestrians, and individual characteristics of each pedestrian, and if desired randomly tagging vehicles and/or pedestrians for further analsyis.

36. A method according to claim 35, further comprising a step of detailed classification of random samples of tagged pedestrians and/or vehicles to determine attributes such as age, appearance, clothing, height and weight, and for vehicles make and model, color, condition and, if visible from license plates, state of origin, and storing the data generated in a central repository.

37. A method according to claim 36, wherein for vehicles, direction of travel is also categorized.

38. A method according to claim 35, further comprising extrapolating GPS coordinates for each tagged entity in an image.

39. A method according to claim 19, wherein each tagged media asset is analysed and data in respect of size, distance of visibility, obstructions, clutter, angle, height, current advertisement content, level presence of and level of illumination are collected and stored in a central data repository.

40. A method according to claim 19, wherein the data analysis step comprises traffic analysis by an analysis of demographic parameters and 'eyeball' content.

41. A method according to claim 40, wherein the traffic patterns are identified in a given geographical area to form a network structure.

42. A method according to claim 40, wherein the traffic analysis is done with a steepest descent estimation model overlaid on a queuing network.

43. A method according to claim 42, wherein the queuing network comprises providing a feasible positive number appropriate for a starting value set in order to estimate traffic inflow and outflow on each route; perturbing each estimate in increments in order to determine the effect of each estimate on an objective function; and adjust each estimate a value proportionate to a partial derivation for the estimate.

44. A method according to claim 43, wherein the queuing network is modeled as a Jackson network.

45. A method according to claim 43 wherein the objection function is a square of deviations of estimated junction traffic from the actual junction traffic.

46. A method according to claim 43, wherein the perturbation and adjustment steps are carried out as long as improvements were obtained in the objective function.

47. A method according to claim 19, wherein locations containing media assets are identified in pre-determined area measurements, wherein at each stage of location identification, unassigned media assets are utilized to identify further clusters, and define further locations.

48. A method according to claim 47, further comprising scraping and collecting place data.

49. A method according to claim 48, wherein the place data contains information relating to establishments, landmarks, names of business establishments, designation of areas in municipal directories and the like, and the place data is classified across multiple characteristics.

50. A method according to claim 49, wherein the multiple characteristics include type of establishment as well as specific brands.

51. A method according to claim 19, wherein each media asset cluster is mapped to a route based on specific GPS and directional information to get a mapped site.

52. A method according to claim 51, wherein each mapped site is analysed to determine site influences comprising one or more of traffic at site, demographics of the traffic, site characteristics, specific entities within a pre-determined set(s) of distance from the site, and location characteristics.

53. A method according to claim 52, wherein traffic at site is estimated based on vehicle and/or pedestrian in direction(s) that enable media to be viewed for a junction, and based on a queuing network model where the site is on a thoroughfare.

54. A method according to claim 19 wherein site demographics and eyeball content is estimated by using traffic at site as a base figure for the site, using site characteristics to estimate a factor, within a range of 0.0-1.0, which determines the visibility of the asset, multiplying the site traffic by this factor, using place and location characteristics to estimate refinements for specific demographics, and adding the refinements to the eyeball estimate.

55. A method according to claim 54, wherein the eyeball information obtained includes characteristics chosen from Total Eyeballs per day, Total Eyeballs per day (in a determinate age grouping), Total Eyeballs per day (in a given vehicle), Total Eyeballs per day (for a given personal identification parameter), Number of Schools in 500 m radius, Shopping Area Score—on a scale of 1-10, and Residential Area Score—on a scale of 1-10.

56. A method according to claim 19, wherein advertising requirements of specific customers are mapped to media assets, to minimize eyeball costs.

57. A method according to claim 56, wherein a sample set of specific advertising requirements for various types of products, by targeted demographics and timing are collected.

58. A method according to claim 57, wherein the sample requirements are analysed to extract specific characteristics for each requirement, said specific characteristics being one or more of luxury product score, product category, targeted demographic 1, targeted demographic 2, duration of exposure, and preferred location.

59. A method according to claim 58, further comprising collecting and collating expert recommendations based on the sample requirements to identify appropriate assets to advertise on.

60. A method according to claim 59, wherein the requirements, sites and matches are processed through a machine learning algorithm to rank and categorize potential matches for new requirements, the algorithm logic comprising normalizing all site characteristics across the population of sites into a 1-10 scale, identifying candidate site attributes impacting on selection of a site for each requirement characteristic, creating a weighted linear scoring function to rank sites for each requirement, wherein each attribute is initially given an equal weight and then the deviation of recommendations from the rankings by the function is measured, perturbing of the weights to measure the impact of changes in weights on the deviation, modifying the weights based on the perturbation results to improve the objective function, and repeated till no significant improvements were observed.

61. A method according to claim 60, wherein the weighed function is used to create a set of further recommendations of new requirements, further recommendations rated by advertiser, based on said ratings, further refinements carried out to the site characteristics.

62. A method according to claim 19, wherein the mapping is done using two-wheeled vehicle helmets provided with high fidelity cameras containing GPS mapping means.

63. A method according to claim 19, wherein the sampling at determined key locations is carried out using two-wheeler vehicle helmets provided with high fidelity cameras containing GPS mapping means.

64. A method according to claim 19, wherein the image data is stored in a database and periodically updated.

65. A method according to claim 19, further comprising deconstructing the image data of running video into separate image frames.

66. A method according to claim 65, further comprising providing individual tags to each image frame to identify location and/or time of image.

67. A method according to claim 65, further comprising providing individual tags to each media asset located in each specific cluster.

68. A method according to claim 19, wherein a frame-by-frame analysis of the image data is performed to categorise data points including traffic patterns along a route, traffic patterns at one or more location(s) and/or one or more junction(s) in a route, number of vehicles, types of vehicles, occupants of vehicles, pedestrian traffic, stationary traffic, and the like.

69. A method according to claim 19, wherein unallocated media assets are allocated to existing clusters, or utilized to form a new cluster.

70. A method according to claim 19, further comprising enabling simulation for advertisers as a real time functionality viewing of proposed media content on a proposed media asset.

71. A method according to claim 19, further comprising alert mechanisms to inform advertiser of eyeballs impacted by an advertisement on one or more selected media assets in dynamic mode.

72. A method according to claim 71, wherein said alert mechanism comprises one or more GPS enabled high fidelity camera(s) located on or around the media asset(s).

73. A method according to claim 19, wherein the media asset is selected from the group consisting of billboards, moving vehicles, local street furniture.

74. A method according to claim 19, wherein the media content is selected from static advertisement content on billboards, dynamic billboard content on billboards, static advertisement content on vehicles, dynamic advertisement content on vehicles, online internet based media content.

75. A method according to claim 74, wherein for a static advertisement content on a vehicle the method comprises documenting the projected route of the vehicle, estimating eyeballs on said route and aggregating the demographics of the route based on vehicle route.

76. A method according to claim 74, further comprising providing multimedia overlays on moving media to enable dynamic advertisement on vehicles, by estimating the eyeballs on a projected route, slicing the route to create the maximum number of relevant eyeballs for each advertisement, and alternating and displaying advertisements during the route based on GPS co-ordinates.

77. A method according to claim 74, further comprising identifying target segments for a given advertisement, identifying for the vehicle used, the location and place metrics of its reach, and selecting a value that optimizes the number of eyeballs, for utilizing media assets such as newspaper inserts and local cable television advertisements.

78. A method according to claim 74, wherein in order to enhance online media effectiveness through offline media, the method comprises identifying the target segment for the ad, using a "starter" display in a specific segment in order to estimate eyeballs, phasing online ads at specific intervals after the starter display, and measuring and fine tuning the clicks per exposure.

\* \* \* \* \*